UNITED STATES PATENT OFFICE.

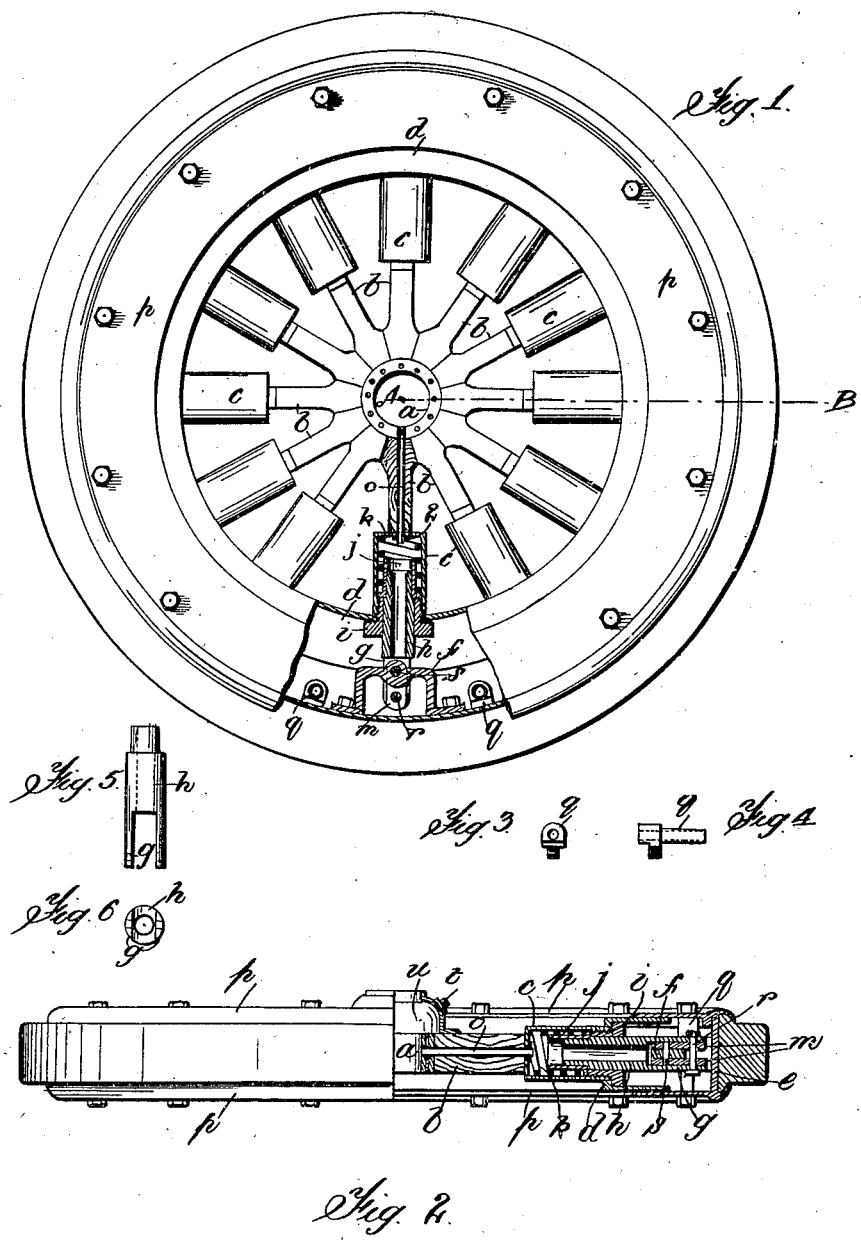

CHARLES WILLIAM PRADEAU, OF SHEPHERD'S BUSH, LONDON, ENGLAND.

WHEEL.

No. 825,157. Specification of Letters Patent. Patented July 3, 1906.

Application filed September 30, 1905. Serial No. 280,801.

*To all whom it may concern:*

Be it known that I, CHARLES WILLIAM PRADEAU, a subject of the King of England, residing at 1 Stowe road, Shepherd's Bush, in the county of London, England, have invented certain new and useful Improvements in Wheels for Motor-Cars and other Vehicles; and I do hereby declare the following to be a full, clear, and exact description of the invention, such as will enable others skilled in the art to which it appertains to make and use the same.

This invention relates to improvements in wheels for motor-cars and other vehicles, the object being to provide a device which will dispense with the necessity for the use of pneumatic tires and which will act as efficiently or more efficiently than the pneumatic tires.

In carrying out my invention I provide at the outer ends of the spokes of the wheel springs which are contained in cylinders or casings attached to the spokes, said springs also acting upon the ends of plungers which work in said cylinders or casings, the other ends of the plungers being pivoted to plates which are attached to the inner surface of the rim of the wheel, said plates having suitable right-angle projections or bearing-bridges to which the said plungers are pivoted by means of a crank-action, the rim of the wheel being made considerably deeper and hollow, so as to protect the said series of plungers and to form a bearing-surface for the said cylinders or casings which protrude through the inner surface of same. Any suitable rim or hard tire may be attached to the rim of the wheel; and in order that my said invention may be better understood I will now proceed to describe the same with reference to the drawings accompanying this specification, in which—

Figure 1 shows elevation of wheel with one spoke in section constructed according to this invention. Fig. 2 is a side elevation, partly in section through the line A B, Fig. 1. Figs. 3, 4, 5, and 6 are details hereinafter referred to.

The same characters of reference are employed to denote the same parts in all the views.

*a* shows ring to take hub of wheel.

*b* shows spokes made of wood or other material.

*c* represents hollow cylinders fixed to the end of the spokes *b*, the lower ends of which cylinders screw onto hollow bosses *i*, fixed to a ring *d*.

*e* is the rim of wheel, which may be provided with a solid tire, as shown at Fig. 2. On the inner circumference of the rim *e* are bolted bearing-pieces *f*.

*g* represents forked pieces to which are connected plungers *h*, passing through the hollow bosses *i*. Over the top of each plunger *h* is passed a cap *j*.

*k* is a helical spring placed in the cylinder *c*, a portion of which spring surrounds the cap *j*, the outer end of said spring pressing on the flange of such cap. The lower end of the plunger *h* is forked, as shown in side elevation, detached at Fig. 5, and to the lower ends of this fork is pivoted a crank-piece *m* by means of a crank-pin *r*, and this crank-piece *m* is mounted at *s* in the bearing-piece *f*. Through the inner ends of the cylinders *c* pass hollow tension-rods *o*. These rods also pass through the spokes *b*, screw into the ring *a*, and are provided at their lower ends with screw-nuts 2. The rods *o* are made hollow for the purpose of lubrication, so that when the lubricant is passed through the lubricating-hole *t* into the oil-box *u* it will pass through the rods *o* to the interior of the cylinders *c* and lubricate the whole mechanism.

*p* represents plates (one at least of which is detachable) bolted on each side of the wheel, so as to cover the space between the ring *d* and the rim *e*.

Fig. 4 shows one of the eyes *q*, which screw onto the rim *e*, detached; and Fig. 3 shows a side elevation of same. Fig. 6 shows plan of under portion of Fig. 5.

It will be seen that as the wheel rotates the pressure upon the ground will cause the spring *k* in the bottom cylinder *c* to be compressed. With regard to the spokes between the vertical and horizontal the corresponding springs will be compressed to a less extent.

Were it not for the employment of the crank-pieces *m*, it is obvious that the springs would not be free to expand and contract, but by the use of such crank-pieces the fork-pieces *g* at the sides of the wheel will be free to move to a limited extent independently of the outer rim, and consequently the free action of the springs is not interfered with, while the rigidity and driving powers of the wheel are by no means impaired.

What I claim, and desire to secure by Letters Patent of the United States of America, is—

1. A spring-wheel for motor-cars and other vehicles, each spoke of which is provided with a hollow cylinder containing a spring-plunger, the outer end of each plunger being formed into a fork to which is pivoted a crank-piece carried by a bearing-bridge attached to the outer rim for the purposes set forth.

2. A spring-wheel for motor-cars, comprising a series of spokes, each provided with a hollow cylinder, a spring-plunger mounted in each cylinder, a fork, formed at the outer end of each plunger, a pivoted member, a bearing-bridge attached to the outer rim for supporting said pivoted member, and means for securing said bearing-bridge to the rim, substantially as described.

In testimony whereof I affix my signature in presence of two witnesses.

CHARLES WILLIAM PRADEAU.

Witnesses:
A. E. VIDAL,
H. D. JAMESON.